(12) United States Patent
Melcher et al.

(10) Patent No.: US 10,287,207 B2
(45) Date of Patent: May 14, 2019

(54) PANE WITH THERMAL RADIATION REFLECTING COATING

(71) Applicant: Saint-Gobain Glass France, Courbevoie (FR)

(72) Inventors: Martin Melcher, Herzogenrath (DE); Jan Hagen, Bonn (DE); Julia Vincent, Aachen (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 551 days.

(21) Appl. No.: 14/769,326

(22) PCT Filed: Dec. 19, 2013

(86) PCT No.: PCT/EP2013/077351
§ 371 (c)(1),
(2) Date: Aug. 20, 2015

(87) PCT Pub. No.: WO2014/127867
PCT Pub. Date: Aug. 28, 2014

(65) Prior Publication Data
US 2016/0002100 A1    Jan. 7, 2016

(30) Foreign Application Priority Data
Feb. 20, 2013  (EP) .................................... 13155969

(51) Int. Cl.
*C03C 17/34* (2006.01)
*C03C 17/36* (2006.01)
(Continued)

(52) U.S. Cl.
CPC ............ *C03C 17/3435* (2013.01); *B32B 7/02* (2013.01); *B32B 17/10036* (2013.01);
(Continued)

(58) Field of Classification Search
CPC ........ B32B 17/10761; B32B 17/10036; B32B 17/10174; C03C 17/3435; C03C 17/3441; C03C 17/36; C03C 17/366
See application file for complete search history.

(56) References Cited

U.S. PATENT DOCUMENTS 3,885,855 A * 5/1975 Gross ....................... C03C 17/22
359/360
5,337,191 A * 8/1994 Austin .................... C03C 17/36
359/359
(Continued)

FOREIGN PATENT DOCUMENTS

CN       101875536 A    11/2010
JP       5-195201 A      8/1993
(Continued)

OTHER PUBLICATIONS

International Search Report dated Feb. 25, 2014 in PCT/EP13/077351 Filed Dec. 19, 2013.

*Primary Examiner* — Prashant J Khatri
(74) *Attorney, Agent, or Firm* — Oblon, McClelland, Maier & Neustadt, L.L.P.

(57) ABSTRACT

The present invention relates to a pane with thermal radiation reflecting coating, comprising a substrate (1) and at least one thermal radiation reflecting coating (2) on at least one of the surfaces of the substrate (1), wherein the coating (2), proceeding from the substrate (1), comprises at least
  one lower dielectric layer (3),
  one functional layer (4) that contains at least one transparent, electrically conductive oxide, and
  one upper dielectric layer (5),
and wherein at least one darkening layer (10) is arranged
  below the lower dielectric layer (3), between the lower dielectric layer (3) and the functional layer (4), between the functional layer (4) and the upper dielectric layer (5), and/or above the upper dielectric layer (5),
(Continued)

Figure 1:
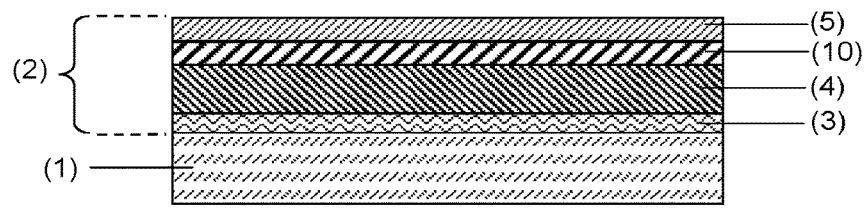

and wherein the darkening layer (10) contains at least one metal, one metal nitride, and/or one metal carbide with a melting point greater than 1900° C. and a specific electrical resistivity less than 500 μohm*cm.

16 Claims, 2 Drawing Sheets

(51) Int. Cl.
| | |
|---|---|
| *G02B 5/28* | (2006.01) |
| *B32B 7/02* | (2019.01) |
| *B32B 17/10* | (2006.01) |
| *G02B 1/11* | (2015.01) |
| *G02B 1/14* | (2015.01) |

(52) U.S. Cl.
CPC .. *B32B 17/10174* (2013.01); *B32B 17/10761* (2013.01); *C03C 17/3441* (2013.01); *C03C 17/36* (2013.01); *C03C 17/366* (2013.01); *C03C 17/3649* (2013.01); *G02B 5/282* (2013.01); *C03C 2217/734* (2013.01); *C03C 2217/94* (2013.01); *C03C 2217/948* (2013.01); *G02B 1/11* (2013.01); *G02B 1/14* (2015.01)

(56) References Cited

U.S. PATENT DOCUMENTS

| | | |
|---|---|---|
| 5,417,827 A | 5/1995 | Finley |
| 5,552,180 A | 9/1996 | Finley et al. |
| 5,705,278 A | 1/1998 | Gillery et al. |
| 5,709,938 A | 1/1998 | Finley |
| 6,139,969 A | 10/2000 | Finley |
| 6,274,244 B1 | 8/2001 | Finley et al. |
| 6,365,014 B2 | 4/2002 | Finley |
| 6,572,990 B1 | 6/2003 | Oyama et al. |
| 6,623,794 B2 | 9/2003 | Finley et al. |
| 6,793,781 B2 | 9/2004 | Finley |
| 8,573,194 B2 | 11/2013 | Henn et al. |
| 2002/0136905 A1* | 9/2002 | Medwick ................ C03C 17/36 428/432 |
| 2005/0123772 A1 | 6/2005 | Coustet et al. |
| 2008/0070045 A1 | 3/2008 | Barton et al. |
| 2009/0320824 A1* | 12/2009 | Henn ................. C03C 17/3417 126/500 |
| 2013/0129945 A1 | 5/2013 | Durandeau et al. |

FOREIGN PATENT DOCUMENTS

| | | |
|---|---|---|
| JP | 2010-013345 A | 1/2010 |
| WO | 2011/105991 A1 | 9/2011 |
| WO | 2012/022876 A2 | 2/2012 |

* cited by examiner

PANE WITH THERMAL RADIATION REFLECTING COATING

The invention relates to a pane with thermal radiation reflecting coating, a method for its production, and the use of a darkening layer in a pane with such a coating.

The interior of a motor vehicle can heat up greatly in the summer with high ambient temperatures and intense direct sunlight. When the outside temperature is lower than the temperature in the vehicle interior, which occurs in particular in the winter, a cold pane acts as a heat sink, which is perceived as unpleasant by the occupants. High heating performance of the climate control system must also be provided to prevent excessive cooling of the interior through the motor vehicle windows.

Thermal radiation reflecting coatings (so-called "low-E coatings") are known. Such a coating reflects a significant part of sunlight, in particular in the infrared range, which, in the summer, results in reduced warming of the vehicle interior. Moreover, the coating reduces the emission of long-wave thermal radiation of a heated pane into the vehicle interior when the coating is applied on the surface of a pane facing the vehicle interior. Moreover, in the case of low outside temperatures in the winter, such a coating reduces the outward emission of heat from the interior into the external surroundings.

For aesthetic or thermal reasons, it can be desirable for a motor vehicle window pane to have reduced light transmittance. This is frequently the case, for example, with rear side windows, rear windows, or roof panels. Such a pane can be produced through the use of a transmittance-reducing thermal radiation reflecting coating. Transmittance-reducing thermal radiation reflecting coatings that contain functional layers made of niobium, tantalum, nickel, chromium, zirconium, or alloys thereof are known to the person skilled in the art, for example, from U.S. Pat. No. 7,592,068B2, U.S. Pat. No. 7,923,131B2, and WO2004076174A1. Due to the low light transmittance of the coating, layer defects, in particular production-related defects which can be present, have an undesirably high contrast. Even very small defects with a size of, for example, ca. 100 μm can be disturbingly noticeable to an observer, in particular when looking through the pane. Such layer defects can, for example, occur in that before and/or during a coating process, particles contaminate the surface of the pane to be coated and are released from the surface after coating. Particles can also be released from the surface during subsequent thermal treatment of the surface of the pane.

To avoid the disadvantages of transmittance-reducing coatings, it is possible to apply transparente thermal radiation reflecting coatings on tinted panes. Such coatings can contain functional layers based on a transparent conductive oxide, such as indium tin oxide, and are known, for example, from EP 2 141 135 A1, WO 2010115558 A1, and WO 2011105991 A1. Panes with very low light transmittance of, for example, less than 8% are, however, not easily realizable in this manner, since, customarily, glasses with light transmittance of less than 10% are not commercially available.

Frequently, after the application of the coating, panes are to be subjected to a thermal treatment and a mechanical transformation. Panes for the automotive sector, for example, side windows and rear windows in the form of single pane safety glass and roof panels, side windows, and rear windows in the form of composite safety glass are typically bent and frequently provided with prestressing or partial prestressing in this process. The bending and prestressing of the pane also places particular demands on the coating.

From US 2008/0070045 A1, another pane with a low-E coating is known, wherein the functional layer contains a transparent conductive oxide. The coating contains a layer for the absorption of thermal radiation, for example, made of titanium nitride. The thickness of the absorption layer is not specified.

From US 2005/0123772 A1, a low-E coating with a functional layer made of silver is known. The coating contains a light-absorbing layer made of titanium nitride. Low-E coatings based on silver are very susceptible to corrosion and can, consequently, not be used on pane surfaces with contact with the environment. Their use is typically restricted to the composite pane surfaces turned toward the intermediate layer. Use on the interior-side surface of a pane is, consequently, not possible.

The object of the present invention consists in providing an improved pane with thermal radiation reflecting coating, wherein the thermal radiation reflecting coating reduces the transmittance of the pane in the visible spectral range. The coating should also be corrosion resistant and should not be damaged during the bending and prestressing of the pane. Moreover, a method for producing the pane should be provided.

The object of the present invention is accomplished according to the invention by a pane with thermal radiation reflecting coating according to claim 1. Preferred embodiments emerge from the subclaims.

The pane according to the invention with thermal radiation reflecting coating comprises a substrate and at least one thermal radiation reflecting coating on at least one of the surfaces of the substrate, wherein the coating, proceeding from the substrate, comprises at least
one lower dielectric layer,
one functional layer that contains at least one transparent, electrically conductive oxide, and
one upper dielectric layer,
and wherein at least one darkening layer is arranged below the lower dielectric layer, between the lower dielectric layer and the functional layer, between the functional layer and the upper dielectric layer, and/or above the upper dielectric layer,
and wherein the darkening layer contains at least one metal, one metal nitride, and/or one metal carbide with a melting point greater than 1900° C. and a specific electrical resistivity less than 500 μohm*cm.

The thermal radiation reflecting coating according to the invention is a layer stack, which comprises at least the following individual layers in the order indicated, proceeding from the substrate:
one lower dielectric layer,
above the lower dielectric layer, one functional layer that contains at least one transparent, electrically conductive oxide (TCO), and
above the functional layer, one upper dielectric layer.

The coating moreover comprises at least one darkening layer according to the invention.

When a first layer is arranged above a second layer, this means, in the context of the invention, that the first layer is arranged farther from the substrate than the second layer. When a first layer is arranged below a second layer, this means, in the context of the invention, that the second layer is arranged farther from the substrate than the first layer.

When a first layer is arranged above or below a second layer, this does not necessarily mean, in the context of the invention, that the first and the second layer are situated in direct contact with each other. One or a plurality of additional layers can be arranged between the first and the second layer, unless this is explicitly ruled out.

The uppermost layer of the coating is, in the context of the invention, that layer that is the greatest distance from the substrate. The lowest layer of the coating is, in the context of the invention, that layer that is the least distance from the substrate.

The values indicated for the specific electrical resistivity are measured at a temperature of 20° C. The values indicated for refractive indices are measured at a wavelength of 550 nm.

The person skilled in the art can, for example, find the values indicated for the melting point and the specific electrical resistivity in tables or data sheets. Typically, the values indicated there are for a solid. In the case of thin films, the melting point and the specific electrical resistivity can deviate therefrom. The tabulated values for the solids nevertheless give the person skilled in the art an adequate criterion for the selection of suitable materials for the darkening layer according to the invention. The values indicated for the melting point and the specific electrical resistivity must be understood in this context.

When a layer or another element contains at least one material, this includes, in the context of the invention, the case in which the layer is made of the material.

The metal, metal nitride, and/or metal carbide according to the invention of the darkening layer has a low specific electrical resistivity and, thus, a definite electrical conductivity. By means of such a conductive darkening layer, the transmittance in the visible spectral range of the thermal radiation reflecting coating is reduced, in particular by absorption and/or reflection. Of course, the darkening layer can also reduce the transmittance in other spectral ranges, for example, the infrared range. The transmittance level can be adjusted by the number and thickness, as well as the material of the darkening layers. Thus, even very dark panes can be realized, in particular, if the coating according to the invention is used on tinted panes. This is a major advantage of the invention.

The metal, metal nitride, and/or metal carbide according to the invention of the darkening layer also has a high melting point. Such darkening layers are advantageously corrosion and oxidation resistant. Consequently, the coated pane can even be subjected to a temperature treatment, a bending process, and/or a prestressing process without the coating being damaged (for instance, by cracks in the darkening layer) or for the light transmittance being increased again as a result of oxidation of the darkening layer. This is another major advantage of the present invention.

The pane according to the invention is preferably provided, in an opening, for example, of a motor vehicle or a building, to separate the interior from the external environment. The coating according to the invention is preferably arranged on the surface of the substrate that is intended to be turned toward the the interior in the installed position of the pane. This is particularly advantageous with regard to the thermal comfort in the interior. The surface that is intended to be turned toward the interior in the installed position of the pane is referred to, in the context of the invention, as the interior-side surface. The coating according to the invention can, in the case of high external temperatures and sunlight, particularly effectively at least partially reflect the thermal radiation radiated by the entire pane in the direction of the interior. In the case of low outside temperatures, the coating according to the invention can effectively reflect the thermal radiation radiated out of the interior and thus reduce the action of the cold pane as a heat sink.

The interior-side emissivity of the pane according to the invention is preferably less than or equal to 35%, particularly preferably less than or equal to 25%, most particularly preferably less than or equal to 20%. Here, the term "interior-side emissivity" refers to the measurement that indicates how much thermal radiation the pane gives off into an interior space, for example, of a building or a motor vehicle, in the installed position compared to an ideal thermal emitter (a black body). In the context of the invention, "emissivity" means the normal emission level at 283 K according to the standard EN 12898.

The pane according to the invention has, in an advantageous embodiment, transmittance in the visible spectral range of less than 25%, preferably less than 15%, particularly preferably less than 10%, most particularly preferably less than 8%, and in particular less than 6%. The invention is particularly advantageous for panes with transmittance of less than 10%. Such panes are difficult to realize by means of a tinted substrate alone because such heavily tinted substrates are typically not available commercially. Panes with such low transmittance can be desirable, in particular as a side window, rear window, or roof panel of a motor vehicle or also in buildings.

The value of the pane according to the invention for the total energy input from sunlight is preferably less than 50%, particularly preferably less than 40%, most particularly preferably less than 30%. This value is also known to the person skilled in the art as the TTS value ("total transmitted sun").

The sheet resistance of the coating according to the invention is preferably from 10 ohm/square to 50 ohm/square, particularly preferably from 15 ohm/square to 30 ohm/square.

The thermal radiation reflecting coating includes, according to the invention, at least one darkening layer. The coating can also include multiple darkening layers, for example, two, three, or four darkening layers, which can be desirable for optical or mechanical reasons.

In an advantageous embodiment, the coating contains one or two darkening layers according to the invention. This is particularly advantageous with regard to simple production of the coating.

The darkening layer or the multiple darkening layers can be arranged, for example, below the lower dielectric layer, between the lower dielectric layer and the functional layer, between the functional layer and the upper dielectric layer, and/or above the upper dielectric layer.

In particularly advantageous embodiments, the darkening layer is or the darkening layers are arranged between the lower dielectric layer and the functional layer and/or between the functional layer and the upper dielectric layer. Preferably, in this case, the darkening layers are in direct contact with the functional layer. It has been surprisingly demonstrated that such a thermal radiation reflecting coating is particularly well-suited to withstand a temperature treatment, a bending process, and a prestressing process undamaged.

The darkening layer preferably has a thickness from 2 nm to 50 nm, particularly preferably from 5 nm to 40 nm, most particularly preferably from 10 nm to 30 nm. This is particularly advantageous with regard to the transmittance-reducing action as well as the corrosion resistance and bendability of the darkening layer.

The darkening layer contains, according to the invention, at least one metal, one metal nitride, and/or one metal carbide. Here, in the context of the invention, the term "metals" also includes alloys of two or more metals. Likewise included are mixed nitrides and mixed carbides of two or more metals as well as alloys, mixed nitrides, or mixed carbides of a metal with silicon and/or aluminum.

Metals and metal carbides can contain small production-related amounts of oxygen. The oxygen content is, in this case, preferably less than 30 wt.-%, particularly preferably less than 20 wt.-%.

The metal that is contained in the darkening layer or whose oxide or nitride is contained in the darkening layer is preferably selected from the transition metals, particularly preferably from the groups IV B, V B, and VI B of the periodic system. The darkening layer contains preferably at least one metal, metal nitride, or metal carbide from the group consisting of hafnium, niobiumium, tantalum, molybdenum, tungsten, titanium nitride, zirconium nitride, hafnium nitride, vanadium nitride, niobium nitride, tantalum nitride, titanium carbide, zirconium carbide, hafnium carbide, vanadium carbide, niobium carbide, tantalum carbide, molybdenum carbide, and tungsten carbide, or mixtures or alloys thereof. The melting points $T_s$ and the specific electrical resistivities ρ of the materials indicated are summarized in Table 1 (cf. also H. O. Pierson: *Handbook of Refractory Carbides and Nitrides*. Westwood: Noyes Publications, 1996).

The melting point of the metal, of the metal nitride, and/or of the metal carbide is preferably greater than 2200° C., particularly preferably greater than 2500° C. This is particularly advantageous with regard to the corrosion and oxidation resistance of the darkening layer.

The specific electrical resistivity of the metal, of the metal nitride, and/or of the metal carbide is preferably less than 200 μohm*cm. This is particularly advantageous with regard to the transmittance-reducing action of the darkening layer.

The darkening layer contains preferably at least one metal, metal nitride, or metal carbide from the group consisting of hafnium, niobiumium, tantalum, molybdenum, tungsten, titanium nitride, zirconium nitride, hafnium nitride, niobium nitride, tantalum nitride, titanium carbide, zirconium carbide, hafnium carbide, vanadium carbide, niobium carbide, tantalum carbide, molybdenum carbide, and tungsten carbide, or mixtures or alloys thereof, or alloys, mixed nitrides or mixed carbides thereof with silicon or aluminum. This is, due to the high melting point greater than 2200° C., particularly advantageous for the corrosion resistance of the darkening layer.

The darkening layer contains most particularly preferably at least one metal, metal nitride, or metal carbide from the group consisting of tantalum, molybdenum, tungsten, titanium nitride, zirconium nitride, hafnium nitride, tantalum nitride, titanium carbide, zirconium carbide, hafnium carbide, vanadium carbide, niobium carbide, tantalum carbide, molybdenum carbide, and tungsten carbide, or mixtures or alloys thereof, or alloys, mixed nitrides or mixed carbides thereof with silicon or aluminum. This is, due to the high melting point greater than 2500° C., most particularly advantageous for the corrosion resistance of the darkening layer.

In principle, nitrides and carbides are preferred to metals or alloys for the darkening layer. It has been demonstrated that such darkening layers are particularly corrosion and oxidation resistant and damage resistant.

The metal nitride and the metal carbide can be stoichiometric, substoichiometric, or supersubstoichiometric relative to the nitrogen or relative to the carbon.

The functional layer has reflecting properties for thermal radiation, in particular infrared radiation, yet is largely transparent in the visible spectral range. According to the invention, the functional layer contains at least one transparent, electrically conductive oxide (TCO). The refractive index of the material of the functional layer is preferably from 1.7 to 2.3. The functional layer preferably contains at least indium tin oxide (ITO). Thus, particularly good results are obtained with regard to the emissivity and the bendability of the coating according to the invention.

A functional layer based on TCO, in particular ITO, is not susceptible to corrosion and is, consequently, particularly suited for use on the interior-side surface of the pane.

The indium tin oxide is preferably deposited using magnetically enhanced cathodic sputtering with a target made of indium tin oxide. The target preferably contains from 75 wt.-% to 95 wt.-% indium oxide and from 5 wt.-% to 25 wt.-% tin oxide as well as production-related admixtures. The deposition of the indium tin oxide is preferably done under a protective gas atmosphere, for example, argon. A small amount of oxygen can also be added to the protective gas, for example, to improve the homogeneity of the functional layer.

Alternatively, the target can preferably contain at least from 75 wt.-% to 95 wt.-% indium and from 5 wt.-% to 25 wt.-% tin. The deposition of the indium tin oxide is then done preferably under the addition of oxygen as reaction gas during the cathodic sputtering.

The emissivity of the pane according to the invention can be influenced by the thickness of the functional layer. The thickness of the functional layer is preferably from 40 nm to 200 nm, particularly preferably from 90 nm to 150 nm, and most particularly preferably from 100 nm to 140 nm, for example, roughly 120 nm. In this range for the thickness of the functional layer, particularly advantageous values for emissivity and a particularly advantageous capability of the functional layer to withstand mechanical transformation such as bending or prestressing without damage are obtained.

However, the functional layer can also include other transparent, electrically conductive oxides, for example, fluorine-doped tin oxide ($SnO_2$:F), antimony-doped tin oxide ($SnO_2$:Sb), mixed indium/zinc oxide (IZO), gallium-doped or aluminum-doped zinc oxide, niobium-doped titanium oxide, cadmium stannate, and/or zinc stannate.

The thermal radiation reflecting coating is a layer stack, which, according to the invention, includes at least two dielectric layers, namely a lower dielectric layer and an upper dielectric layer. The lower dielectric layer is arranged below the functional layer; the upper dielectric layer is arranged above the functional layer. The coating according to the invention can however also include one or a plurality

TABLE 1

| Group | | $T_S$/ ° C. | ρ/ μΩcm | | $T_S$/ ° C. | ρ/ μΩcm | | $T_S$/ ° C. | ρ/ μΩcm |
|---|---|---|---|---|---|---|---|---|---|
| IV B | | | | TiN | 2950 | 20 | TiC | 3067 | 68 |
| | | | | ZrN | 2980 | 14 | ZrC | 3420 | 43 |
| | Hf | 2230 | 35 | HfN | 3387 | 33 | HfC | 3928 | 37 |
| V B | | | | VN | 2177 | 85 | VC | 2830 | 60 |
| | Nb | 2468 | 13 | NbN | 2400 | 68 | NbC | 3600 | 35 |
| | Ta | 2996 | 12 | TaN | 3093 | 193 | TaC | 3950 | 25 |
| VI B | Mo | 2620 | 5.6 | | | | $Mo_2C$ | 2520 | 71 |
| | W | 3410 | 5.3 | | | | WC | 3410 | 22 | of additional dielectric layers, which can be arranged below and/or above the functional layer.

The dielectric layers can contain, for example, silicon oxide ($SiO_2$), silicon nitride ($Si_3N_4$), zinc oxide (ZnO), tin oxide ($SnO_2$), mixed tin zinc oxide ($SnZnO_x$), zirconium oxide ($ZrO_2$), hafnium oxide ($HfO_2$), tantalum oxide ($Ta_2O_5$), tungsten oxide ($WO_3$), niobium oxide ($Nb_2O_5$), or titanium oxide ($TiO_2$) and have, for example, thicknesses from 5 nm to 200 nm.

The darkening layer or the darkening layers can, in principle, be arranged at any position in the layer stack. The darkening layer can be arranged, for example, between the functional layer and the adjacent dielectric layer above and/or below the functional layer. The darkening layer can be arranged, for example, below the lowest dielectric layer. The darkening layer can be arranged, for example, above the uppermost dielectric layer. The darkening layer can also be arranged between two adjacent dielectric layers.

In a preferred embodiment of the invention, the lower dielectric layer is an adhesive layer. The adhesive layer results in a durably stable adhesion of the layers deposited above the adhesive layer on the substrate. The adhesive layer further prevents the accumulation of ions diffusing out of the substrate in the boundary area to the functional layer, in particular of sodium ions, if the substrate is made of glass. Such ions can lead to corrosion and to low adhesion of the functional layer. The adhesive layer is, consequently, particularly advantageous with regard to the stability of the functional layer.

The adhesive layer preferably contains at least one oxide or one nitride. The adhesive layer particularly preferably contains silicon oxide ($SiO_2$) or silicon nitride ($Si_3N_4$). This is particularly advantageous with regard to the adhesion of the layers deposited above the adhesive layer on the substrate. The silicon oxide can have dopants, for example, fluorine, carbon, nitrogen, boron, phosphorus, and/or aluminum. The silicon oxide or silicon nitride is most particularly preferably doped with aluminum ($SiO_2$:Al, $Si_3N_4$:Al), doped with boron ($SiO_2$:B, $Si_3N_4$:B), or doped with zirconium ($SiO_2$:Zr, $Si_3N_4$:Zr). This is particularly advantageous with regard to the optical properties of the coating as well as the speed of the application of the adhesive layer, for example, by cathodic sputtering.

The silicon oxide or the silicon nitride is preferably deposited using magnetically enhanced cathodic sputtering with a target that contains at least silicon. The target for the deposition of an adhesive layer containing aluminum-doped silicon oxide or silicon nitride preferably contains from 80 wt.-% to 95 wt.-% silicon and from 5 wt.-% to 20 wt.-% aluminum as well as production-related admixtures. The target for the deposition of an adhesive layer containing boron-doped silicon oxide or silicon nitride preferably contains from 99.9990 wt.-% to 99.9999 wt.-% silicon and from 0.0001 wt.-% to 0.001 wt.-% boron as well as production-related admixtures. The target for the deposition of an adhesive layer containing zirconium-doped silicon oxide or silicon nitride preferably contains from 60 wt.-% to 90 wt.-% silicon and from 10 wt.-% to 40 wt.-% zirconium as well as production-related admixtures. The deposition is preferably done under addition of oxygen as reaction gas in the case of the silicon oxide; under the addition of nitrogen as reaction gas in the case of the silicon nitride during the cathodic sputtering.

The doping of the adhesive layer can also improve the smoothness of the layers applied above the adhesive layer. High smoothness of layers is particularly advantageous in the case of use of the pane according to the invention in the motor vehicle sector since, by this means, an unpleasant rough surface feel of the pane is avoided. When the pane according to the invention is a side window pane, it can be moved with low friction to the sealing lips.

However, the adhesive layer can also contain other materials, for example, other oxides such as $TiO_2$, $Al_2O_3$, $Ta_2O_5$, $Y_2O_3$, $ZrO_2$, $HfO_2$, $WO_3$, $Nb_2O_5$ ZnO, $SnO_2$, and/or $ZnSnO_x$ or nitrides such as AlN.

The adhesive layer preferably has a thickness from 10 nm to 150 nm, particularly preferably from 15 nm to 50 nm, for example, roughly 30 nm. This is particularly advantageous with regard to the adhesion of the coating according to the invention and the prevention of the diffusion of ions from the substrate into the functional layer.

In a preferred embodiment of the invention, the upper dielectric layer is a barrier layer for regulating oxygen diffusion during a temperature treatment of the pane. Thus, by means of the barrier layer, the oxygen content of the functional layer can be influenced and adjusted, which has a definite influence on the properties of the functional layer. Both an excessively low oxygen content and an excessively high oxygen content result in excessively high sheet resistance and, thus, in excessively high emissivity. In addition, an excessively low oxygen content results in a definite, often undesirable color impression. An excessively high oxygen content of the functional layer results in the fact that the functional layer is damaged during the bending, which is evidenced in particular as cracks within the functional layer.

The thickness of the barrier layer is preferably from 5 nm to 50 nm, particularly preferably from 7 nm to 40 nm, most particularly preferably from 10 nm to 30 nm. Thus, particularly good results with regard to sheet resistance and bendability are obtained. In addition, a barrier layer with these thicknesses advantageously protects the coating against corrosion from a moist atmosphere.

The refractive index of the material of the barrier layer is preferably greater than or equal to the refractive index of the material of the functional layer. The refractive index of the material of the barrier layer is particularly preferably from 1.7 to 2.3. Thus, advantageous optical properties of the coating are obtained, in particular an aesthetic color impression during the reflection of light.

The barrier layer preferably contains at least one oxide and/or one nitride. The oxide and/or nitride can be stoichiometric or non-stoichiometric. The barrier layer particularly preferably contains at least silicon nitride ($Si_3N_4$). This is particularly advantageous with regard to the influence of the barrier layer on the oxidation of the functional layer and on the optical properties of the pane. The silicon nitride can have dopants, for example, titanium, zirconium, boron, hafnium, and/or aluminum. The silicon nitride is most particularly preferably doped with aluminum ($Si_3N_4$:Al) or doped with zirconium ($Si_3N_4$:Zr) or doped with boron ($Si_3N_4$:B). This is particularly advantageous with regard to the optical properties, the bendability, the smoothness, and the emissivity of the coating as well as the speed of the application of the barrier layer, for example, by cathodic sputtering.

The silicon nitride is preferably deposited using magnetically enhanced cathodic sputtering with a target that contains at least silicon. The target for the deposition of a barrier layer containing aluminum-doped silicon nitride preferably contains from 80 wt.-% to 95 wt.-% silicon and from 5 wt.-% to 20 wt.-% aluminum as well as production-related admixtures. The target for the deposition of a barrier layer containing boron-doped silicon nitride preferably contains from 99.9990 wt.-% to 99.9999 wt.-% silicon and from 0.0001 wt.-% to 0.001 wt.-% boron as well as production-related admixtures. The target for the deposition of a barrier layer containing zirconium-doped silicon nitride preferably contains from 60 wt.-% to 90 wt.-% silicon and from 10 wt.-% to 40 wt.-% zirconium as well as production-related admixtures. The deposition of the silicon nitride is preferably done under the addition of nitrogen as reaction gas during the cathodic sputtering.

During a temperature treatment after the application of the coating according to the invention, the silicon nitride can be partially oxidized. A barrier layer deposited as $Si_3N_4$ then contains, after the temperature treatment, $Si_xN_yO_z$, with the oxygen content typically from 0 atomic-% to 35 atomic-%.

However, the barrier layer can alternatively also contain, for example, at least $WO_3$, $Nb_2O_5$, $Bi_2O_3$, $TiO_2$, and/or AlN.

In a preferred embodiment of the invention, a dielectric antireflection layer is arranged above the upper dielectric layer. The antireflection layer reduces reflections in the visible spectral range on the pane according to the invention and causes a neutral color impression of reflected and transmitted light. The antireflection layer also improves the corrosion resistance of the functional layer. The material of the antireflection layer preferably has a refractive index that is less than the refractive index of the material of the functional layer. The refractive index of the material of the antireflection layer is preferably less than or equal to 1.8.

The antireflection layer preferably contains at least one oxide. The antireflection layer particularly preferably contains silicon dioxide ($SiO_2$). This is particularly advantageous with regard to the optical properties of the pane and the corrosion resistance of the functional layer. The silicon dioxide can have dopants, for example, fluorine, carbon, nitrogen, boron, phosphorus, and/or aluminum. The silicon oxide is most particularly preferably doped with aluminum ($SiO_2$:Al), doped with boron ($SiO_2$:B), or doped with zirconium ($SiO_2$:Zr).

However, the antireflection layer can also contain other materials, for example, other oxides such as $Al_2O_3$.

The antireflection layer preferably has a thickness from 20 nm to 150 nm, particularly preferably from 40 nm to 100 nm. This is particularly advantageous with regard to low reflection and high visible-light transmittance as well as the setting of a selected color impression of the pane and the corrosion resistance of the functional layer.

In a particularly advantageous embodiment, the thermal radiation reflecting coating on the substrate comprises at least
  one adhesive layer as the lower dielectric layer,
  above the adhesive layer, one functional layer,
  above the functional layer, one barrier layer for regulating the oxygen diffusion as the upper dielectric layer, and
  above the barrier layer, one antireflection layer.

The darkening layer or the multiple darkening layers are preferably arranged below the adhesive layer (i.e., between the substrate and the adhesive layer), between the adhesive layer and the functional layer, between the functional layer and the barrier layer, and/or between the barrier layer and the antireflection layer.

Above the upper dielectric layer (and, optionally, above the antireflection layer), a cover layer can be arranged. The cover layer is preferably the uppermost layer of the coating according to the invention. The cover layer protects the coating according to the invention against damage, in particular against scratching. The cover layer preferably contains at least one oxide, particularly preferably at least titanium oxide ($TiO_2$), zirconium oxide ($ZrO_2$), hafnium oxide ($HfO_2$), niobium oxide ($Nb_2O_5$), tantalum oxide ($Ta_2O_5$), chromium oxide ($Cr_2O_3$), tungsten oxide ($WO_3$), and/or cerium oxide ($CeO_2$). The thickness of the cover layer is preferably from 2 nm to 50 nm, particularly preferably from 5 nm to 20 nm. Thus, particularly good results relative to scratch resistance are obtained. The darkening layer can also be arranged between the upper dielectric layer and the cover layer or between the antireflection layer and the cover layer.

Below the lower dielectric layer, an additional dielectric adhesion-promoting layer can also be arranged, preferably with a thickness from 2 nm to 15 nm. For example, the adhesive layer can contain $SiO_2$, and the additional adhesion-promoting layer can contain at least one oxide such as $TiO_2$, $Al_2O_3$, $Ta_2O_5$, $Y_2O_3$, ZnO, and/or $ZnSnO_x$, or a nitride such as $Si_3N_4$ or AlN. Advantageously, the adhesion of the coating according to the invention can be further improved by the adhesion-promoting layer. Moreover, the adhesion-promoting layer enables improved adjustment of the color values and the transmittance or reflection.

The substrate preferably contains glass, particularly preferably flat glass, float glass, quartz glass, borosilicate glass, soda lime glass, or plastics, preferably rigid plastics, in particular polyethylene, polypropylene, polycarbonate, polymethyl methacrylate, polystyrene, polyamide, polyester, polyvinyl chloride, and/or mixtures thereof.

In an advantageous embodiment of the invention, the substrate is tinted and/or colored. Through the combination of a tinted or colored substrate with the coating according to the invention, improved thermal radiation reflecting panes with reduced transmittance in the visible spectral range can, in particular, be realized. Such panes can be used, for example, in the automotive sector as a side windows, rear windows, or roof panels and can be desirable for aesthetic or thermal reasons. Compared to clear substrates with transmittance-reducing thermal radiation reflecting coatings (for example, based on chromium), any layer defects present are less disturbingly noticeable in panes according to the invention. In addition, the transmittance through a tinted substrate is further reduced by the coating according to the invention, such that panes with very low light transmittance can be realized. The substrate preferably has transmittance in the visible spectral range of less than 40%, particularly preferably less than 20%, and most particularly preferably less than 15%, for example, roughly 10%. The substrate can, however, in principle, also have higher transmittance, for example, greater than or equal to 70%. Thus, a slight tinting can be obtained by means of the coating according to the invention.

In a particularly advantageous embodiment, the substrate has transmittance in the visible spectral range of less than 15%, and the pane with thermal radiation reflecting coating has transmittance of less than 10%. In a most particularly advantageous embodiment, the substrate has transmittance in the visible spectral range of less than 10%, and the pane with thermal radiation reflecting coating has transmittance of less than 7%, in particular less than 6%. Thus, particularly dark panes can be realized.

The thickness of the substrate can vary widely and thus be ideally adapted to the requirements of the individual case. Preferably, panes with the standard thicknesses from 1.0 mm to 25 mm and more preferably from 1.4 mm to 4.9 mm are used. The size of the substrate can vary widely and is determined by the use according to the invention. The substrate has, for example, in automotive engineering and the architectural sector, customary areas from 200 $cm^2$ all the way to 20 $m^2$.

The substrate can be flat or also slightly or greatly curved in one or a plurality of spatial directions. Flat panes occur, for example, in glazings in the architectural sector or in large-area glazings of buses, trains, or tractors. Curved panes occur, for example, in glazings in the motor vehicle sector, with typical radii of curvature in the range from roughly 10 cm to roughly 40 m. The radius of curvature does not have to be constant over the entire pane; greatly curved and less greatly curved regions can be present in one pane. It is a particular advantage of the invention that a flat substrate can be provided with the coating according to the invention and that the coating is not damaged during a downstream bending process that is typically carried out at elevated temperatures of, for example, 500° C. to 700° C. In principle, the coating can, of course, also be applied to a curved substrate. The three-dimensional shape of the substrate preferably has no shadow zones such that the substrate can, for example, be coated by cathodic sputtering.

The coating according to the invention can be applied on the surface of the substrate over its entire area. However, the surface of the substrate can also have coating-free regions. The surface of the substrate can, for example, have a circumferential coating-free edge region and/or a coating-free region that serves as a data transmission window or a communication window.

The substrate can also be provided on both surfaces with a thermal radiation reflecting coating according to the invention in each case.

In an advantageous embodiment of the invention, the substrate is bonded to a cover pane via at least one thermoplastic intermediate layer to form a composite pane. The cover pane is preferably intended to face the outside environment in the installed position of the composite pane, whereas the substrate faces the interior. The coating according to the invention is preferably arranged on the surface of the substrate facing away from the cover pane.

The cover pane preferably contains glass, particularly preferably flat glass, float glass, quartz glass, borosilicate glass, soda lime glass, or plastics, preferably rigid plastics, in particular polyethylene, polypropylene, polycarbonate, polymethyl methacrylate, polystyrene, polyamide, polyester, polyvinyl chloride, and/or mixtures thereof. The cover pane preferably has a thickness from 1.0 mm to 25 mm and particularly preferably from 1.4 mm to 4.9 mm.

The thermoplastic intermediate layer preferably contains thermoplastic plastics, for example, polyvinyl butyral (PVB), ethylene vinyl acetate (EVA), polyurethane (PU), polyethylene terephthalate (PET), or multiple layers thereof, preferably with thicknesses from 0.3 mm to 0.9 mm.

The composite pane has, in an advantageous embodiment, transmittance in the visible spectral range of less than 25%, preferably less than 15%, particularly preferably less than 10%, most particularly preferably less than 8%, and in particular less than 6%. The substrate, the cover pane, and/or the thermoplastic intermediate layer are preferably tinted and/or colored. The cover pane preferably has transmittance in the visible spectral range of less than 40%; the thermoplastic intermediate layer preferably has transmittance of 20% to 70%.

In a particularly advantageous embodiment, the coating according to the invention is applied on the surface of the substrate facing the interior, with the substrate constituting the pane of a composite pane facing the interior. A sun protection coating is further applied on the surface of the substrate facing the cover pane, on the surface of the cover pane facing the substrate, or on a carrier film in the thermoplastic intermediate layer. The sun protection coating is advantageously protected there against corrosion and mechanical damage. The sun protection coating preferably comprises at least one metallic layer based on silver or a silver-containing alloy with a thickness from 5 nm to 25 nm. Particularly good results are obtained with two or three functional layers that are separated from each other by dielectric layers with thicknesses from 10 nm to 100 nm. The sun protection coating reflects fractions of the incident sunlight outside the visible spectral range, in particular in the infrared spectral range. By means of the sun protection coating, the heating up of the interior by direct sunlight is reduced. In addition, the sun protection coating reduces the heating of the elements of the composite pane arranged behind the sun protection coating and, thus, the thermal radiation emitted by the composite pane. Through the combination of the sun protection coating with the coating according to the invention for reflection of thermal radiation, the thermal comfort in the interior is advantageously further improved.

The substrate can, for example, also be bonded to another pane via spacers to form an insulating glazing unit. The substrate can also be bonded to more than one other pane via thermoplastic intermediate layers and/or spacers.

The invention further includes a method for producing a pane with thermal radiation reflecting coating, wherein at least (a) one lower dielectric layer, (b) one functional layer that contains at least one transparent, electrically conductive oxide (TCO), and (c) one upper dielectric layer are applied in succession on a substrate and wherein, moreover, before process step (a), between process step (a) and (b), between process step (b) and (c), and/or after process step (c), at least one darkening layer that contains at least one metal, one metal nitride, and/or one metal carbide with a melting point greater than 1900° C. and a specific electrical resistivity less than 500 µohm*cm is applied.

Preferably, an antireflection layer is applied after the upper dielectric layer. A cover layer can be applied after the upper dielectric layer and, optionally, the antireflection layer.

In principle, a darkening layer can be applied before and/or after each layer. One or even a plurality of darkening layers can be applied.

The individual layers are deposited by methods known per se, preferably by magnetically enhanced cathodic sputtering. This is particularly advantageous with regard to simple, quick, economical, and uniform coating of the substrate. The cathodic sputtering is done in a protective gas atmosphere, for example, of argon, or in a reactive gas atmosphere, for example, by addition of oxygen, a hydrocarbon (for example, methane), or nitrogen.

However, the individual layers can also be applied by other methods known to the person skilled in the art, for example, by vapor deposition or chemical vapor deposition (CVD), by atomic layer deposition (ALD), by plasma-enhanced chemical vapor deposition (PECVD), or by wet chemical methods.

Preferably after the application of the thermal radiation reflecting coating, the pane is subjected to a temperature treatment. The substrate with the coating according to the invention is heated to a temperature of at least 200° C., particularly preferably at least 300° C. The crystallinity of the functional layer is, in particular, improved by the temperature treatment. Thus, in particular, the reflecting properties relative to thermal radiation as well as the optical properties of the pane are significantly improved. The darkening layer according to the invention is not damaged during the temperature treatment. In particular, the darkening layer is not oxidized during the temperature treatment to an extent that results in an increase of light transmittance.

In an advantageous embodiment of the method according to the invention, the temperature treatment occurs within a bending process. The substrate with the coating according to the invention is bent, in the heated state, in one or a plurality of spatial directions. The temperature to which the substrate is heated is preferably from 500° C. to 700° C. It is a particular advantage of the coating for the reflection of thermal radiation according to the invention that it can be subjected to such a bending process without being damaged. The darkening layer according to the invention is not damaged during the bending process, for example, by cracks.

Of course, other temperature treatment steps can occur before or after the bending process. A temperature treatment can, alternatively, also be performed using laser radiation.

In an advantageous embodiment, after the temperature treatment and, optionally, after bending, the substrate can be provided with prestressing or partial prestressing. For this, the substrate is suitably cooled in a manner known per se. A prestressed substrate typically has surface compressive stresses of at least 69 MPa. A partially prestressed substrate typically has surface compressive stresses of 24 MPa to 52 MPa. A prestressed substrate is suitable as single pane safety glass, for example, as a side window or rear window of a motor vehicle.

In an advantageous embodiment of the invention, after the temperature treatment and, optionally, after the bending process and/or the prestressing process, the substrate is bonded via at least one thermoplastic intermediate layer to a cover pane to form a composite pane. The substrate is preferably arranged in the composite such that the surface provided with the coating according to the invention faces away from the thermoplastic intermediate layer and the cover pane.

The invention further includes the use of the pane according to the invention with thermal radiation reflecting coating as a pane or as a component of a pane, in particular as a component of an insulating glazing unit or a composite pane, in buildings, in particular in the access or window area, as a fire door, as a built-in component in furniture and devices, in particular electronic devices with a cooling or heating function, for example, as an oven door or refrigerator door, or in means of transportation for travel on land, in the air, or on water, in particular in trains, ships, and motor vehicles, for example, as a rear window, side window, and/or roof panel.

The invention moreover includes the use of a darkening layer according to the invention in a thermal radiation reflecting coating or in a pane with thermal radiation reflecting coating according to the invention for reducing transmittance in the visible spectral range.

The invention is explained in detail in the following with reference to drawings and exemplary embodiments. The drawings are schematic representations and not true to scale. The drawings in no way restrict the invention.

Figure 2:
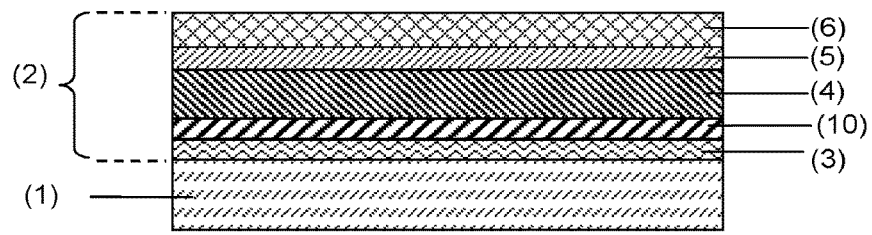
Figure 3:
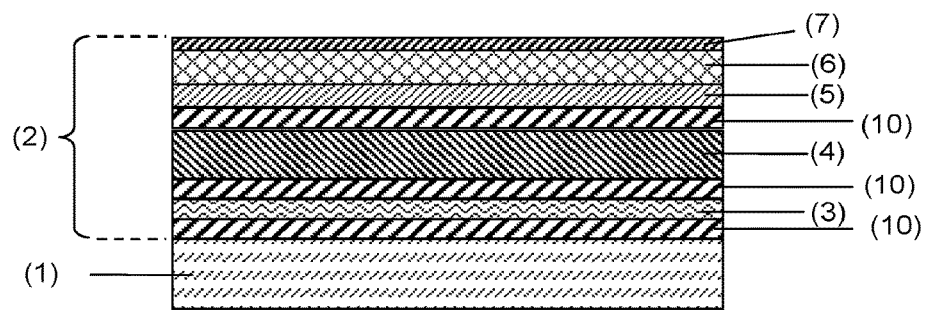
Figure 4:
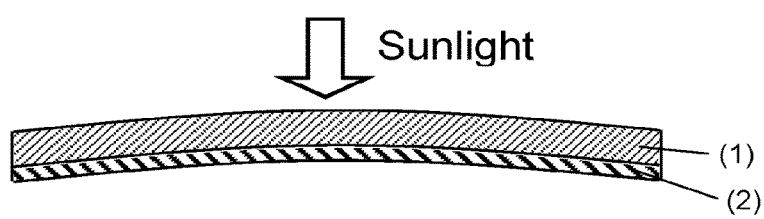
Figure 5:
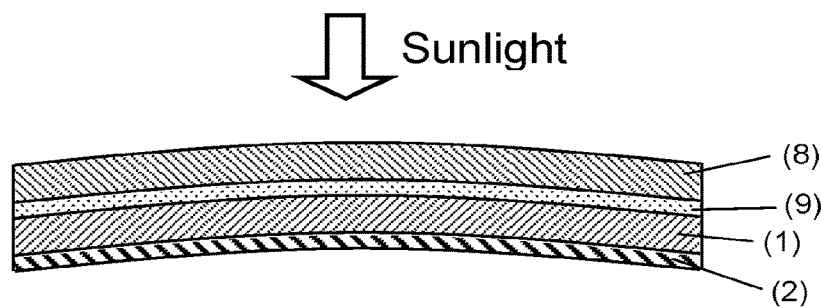
Figure 6:
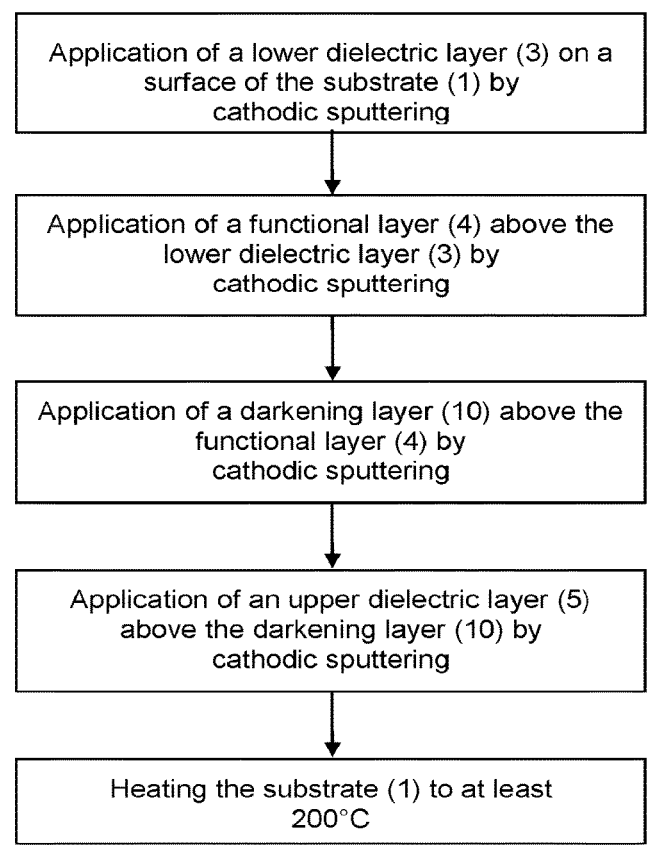

They depict:

FIG. 1 a cross-section through an embodiment of the pane according to the invention with thermal radiation reflecting coating, FIG. 2 a cross-section through another embodiment of the pane according to the invention with thermal radiation reflecting coating, FIG. 3 a cross-section through another embodiment of the pane according to the invention with thermal radiation reflecting coating, FIG. 4 a cross-section through another embodiment of the pane according to the invention with thermal radiation reflecting coating, FIG. 5 a cross-section through a composite pane including a pane according to the invention, FIG. 6 a detailed flow chart of an embodiment of the method according to the invention.

FIG. 1 depicts a cross-section through an embodiment of the pane according to the invention with the substrate 1 and the thermal radiation reflecting coating 2 (also called low-E-coating). The substrate 1 contains soda lime glass and has a thickness of 2.9 mm. The coating 2 comprises a lower dielectric layer 3, a functional layer 4, a darkening layer 10, and an upper functional layer 5. The layers are arranged in the order indicated with increasing distance from the substrate 1.

The functional layer 4 is made of indium tin oxide (ITO) and has a thickness of roughly 100 nm. The lower dielectric layer 3 and the upper dielectric layer 5 can be configured in a manner known per se to the person skilled in the art and can, for example, be made of silicon oxide ($SiO_2$) or silicon nitride ($Si_3N_4$) and have a thickness of roughly 100 nm.

The darkening layer 10 is made of titanium nitride ($TiN_x$) and has a thickness of roughly 20 nm. The darkening layer 10 effects a reduction in the transmittance of the coating 2 in the visible spectral range.

The darkening layer 10 can, alternatively, also be arranged between the lower dielectric layer 3 and the functional layer 4, or between the substrate 1 and the lower dielectric layer 3. The coating 2 can, alternatively, also have a plurality of darkening layers 10.

By means of the darkening layer 10, the light transmittance of the coating 2 is reduced. If the substrate 1 is tinted, the light transmittance through the coating 2 is further reduced. Consequently, it is possible to realize very dark panes, for example, with transmittance in the visible spectral range of less than 10%. Panes with such low transmittance are difficult to produce by means of a tinted substrate alone because glasses with such with such heavy tinting are typically not available commercially. In contrast to a coating with a transmittance-reducing functional layer (based, for example, on nickel, chromium, zirconium, tantalum, or niobium) on a clear substrate, production-related layer defects of the coating 2 according to the invention on a tinted substrate 1 have a lower contrast. Consequently, layer defects are less disturbingly noticeable to the observer. These are major advantages of the present invention.

FIG. 2 depicts a cross-section through another embodiment of the pane according to the invention with the substrate 1 and the thermal radiation reflecting coating 2. The substrate 1 is configured as in FIG. 1. The coating 2 comprises a lower dielectric layer 3, a darkening layer 10, a functional layer 4, an upper functional layer 5, and an antireflection layer 6. The layers are arranged in the order indicated with increasing distance from the substrate 1.

The lower dielectric layer 3 is an adhesive layer made of aluminum-doped silicon dioxide ($SiO_2$:Al) and has a thickness of roughly 30 nm. The functional layer 4 is made of indium tin oxide (ITO) and has a thickness of roughly 120 nm. The upper dielectric layer 5 is a barrier layer for regulating oxygen diffusion during a temperature treatment of the pane. The barrier layer 5 is made of aluminum-doped silicon nitride ($Si_3N_4$:Al) and has a thickness of roughly 10 nm. The antireflection layer 6 is made of aluminum-doped silicon dioxide ($SiO_2$:Al) and has a thickness of roughly 40 nm.

The darkening layer 10 between the lower dielectric layer 3 and the functional layer 4 is made of titanium nitride ($TiN_x$) and has a thickness of roughly 20 nm. The darkening layer 10 effects a reduction in the transmittance of the coating 2 in the visible spectral range.

The darkening layer 10 can, alternatively, also be applied in a different position, for example, between the functional layer 4 and the upper dielectric layer 5, between the upper dielectric layer 5 and the antireflection layer 6, or between the substrate 1 and the lower dielectric layer 3. The coating 2 can, alternatively, also have a plurality of darkening layers 10.

FIG. 3 depicts a cross-section through another embodiment of the pane according to the invention with the substrate 1 and the thermal radiation reflecting coating 2. The coating 2 comprises, as in FIG. 2, a lower dielectric layer 3 (adhesive layer), a functional layer 4, an upper dielectric layer 5 (barrier layer), and an antireflection layer 6. The layers 3, 4, 5, and 6 are configured as in FIG. 2. The coating 2 moreover includes a cover layer 7 above the antireflection layer 6. The cover layer 7 contains, for example, $Ta_2O_5$ or $TiO_2$ and has a thickness of 10 nm. The cover layer advantageously protects the coating 2 against mechanical damage, in particular against scratching.

The coating 2 further includes three darkening layers 10. The first darkening layer 10 is arranged between the substrate 1 and the lower dielectric layer 3. The second darkening layer 10 is arranged between the lower dielectric layer 3 and the functional layer 4. The third darkening layer 10 is arranged between the functional layer 4 and the upper dielectric layer 5. The darkening layers 10 are made of $TiN_x$ and have thicknesses between 10 nm and 15 nm. By means of three darkening layers 10 according to the invention 10, the light transmittance is more greatly reduced than by a single darkening layer 10, without the advantageous optical properties being lost as a result of an excessively thick darkening layer 10.

FIG. 4 depicts a cross-section through a pane according to the invention with thermal radiation reflecting coating 2. The pane is intended as a side window of a motor vehicle. The substrate 1 has a thickness of 3.15 mm. The substrate 1 is made of tinted soda lime glass and has transmittance of roughly 14% in the visible spectral range. The pane is thermally prestressed and bent, as is customary for side windows in the automotive sector.

The coating 2 is applied on the interior-side surface of the substrate 1. There, the advantageous effect of the coating 2 on the thermal comfort in the interior of the vehicle is particularly pronounced. The coating 2 reflects part of the sunlight incident via the pane, in particular in the infrared range. The thermal radiation emitted from the warm pane in the direction of the vehicle interior is, moreover, at least partially suppressed as a result of the low emissivity of the coating 2. Thus, the interior is less strongly heated in the summer. In the winter, the thermal radiation emanating from the interior is reflected. Consequently, the cold pane acts less strongly as an uncomfortable heat sink. Moreover, the necessary heating performance of the climate control system can be reduced, which results in significant energy savings.

The coating 2 is preferably applied on the flat substrate 1 before the bending of the substrate 1. Coating a flat substrate is technically significantly simpler than coating a curved substrate. The substrate 1 is then typically heated to a temperature from 500° C. to 700° C., for example, 640° C.

On the one hand, the temperature treatment is necessary to bend the substrate 1. On the other hand, the emissivity of the coating 2 is regularly improved by the temperature treatment. The upper dielectric layer 5 implemented as a barrier layer influences the extent of oxidation of the functional layer 4 during the temperature treatment. The oxygen content of the functional layer 4 is sufficiently low after the temperature treatment that the coating 2 can be subjected to a bending process. An excessively high oxygen content would result in damage to the functional layer 4 during bending. On the other hand, the oxygen content of the functional layer 4 is sufficiently high after the temperature treatment for low emissivity.

The coating 2 is configured as in FIG. 2. The light transmittance through the pane is further reduced by the darkening layer 10. The pane with the coating 2 thus has transmittance in the visible spectral range of less than 10%. Such dark (rear) side windows can be desirable for thermal and/or aesthetic reasons. The darkening layer 10 according to the invention is suitable due to its corrosion and oxidation resistance to withstand the temperature treatment and the bending process undamaged.

FIG. 5 depicts a cross-section through a pane according to the invention with thermal radiation reflecting coating 2 as part of a composite pane. The substrate 1 is bonded to a cover pane 8 via a thermoplastic intermediate layer 9. The composite pane is intended as a roof panel for a motor vehicle. The composite pane is curved as is customary for panes in the automotive sector. In the installed position of the composite pane, the cover pane 8 faces the outside environment and the substrate 1 faces the vehicle interior. The interior-side surface of the substrate 1, which faces away from the cover pane 8 and the thermoplastic intermediate layer 9, is provided with the coating 2 according to the invention. The substrate 1 and the cover pane 8 are made of soda lime glass and have, in each case, a thickness of 2.1 mm. The thermoplastic intermediate layer 9 contains polyvinyl butyral (PVB) and has a thickness of 0.76 mm.

The substrate 1, the cover pane 8, and the thermoplastic intermediate layer 9 are tinted. By means of the coating 2, the light transmittance is further reduced. Thus, very dark composite panes can be realized.

FIG. 6 depicts a flowchart of an exemplary embodiment of the method according to the invention for producing a pane with thermal radiation reflecting coating 2.

EXAMPLES

Panes with thermal radiation reflecting coating 2 were produced according to the invention. The precise layer sequence with the materials used and layer thicknesses of Examples 1 to 8 are presented in Table 2 and Table 3. The substrate 1 was made of tinted soda lime glass and had transmittance in the visible spectral range of 25%. The darkening layers 10 contained titanium nitride. Titanium nitride has (based on a solid) a melting point of 2950° C. and specific electrical resistivity of 20 μohm*cm. The examples differ in terms of the number and the thickness as well as the position of the darkening layers 10.

In all examples, the substrate 1 was initially flat and was provided with the coating 2 according to the invention by means of cathodic sputtering. The substrate 1 with the coating 2 was then subjected for 10 minutes to a temperature treatment at 640° C., bent in the process, and provided with a radius of curvature of roughly 30 cm.

TABLE 2

| Reference Character | Material | Thickness | | | |
|---|---|---|---|---|---|
| | | Example 1 | Example 2 | Example 3 | Example 4 |
| 2   6 | SiO$_2$:Al | 70 nm | 70 nm | 70 nm | 70 nm |
| 10 | TiN$_x$ | — | — | — | — |
| 5 | Si$_3$N$_4$:Al | 20 nm | 20 nm | 20 nm | 20 nm |
| 10 | TiN$_x$ | 5 nm | 10 nm | 10 nm | — |
| 4 | ITO | 120 nm | 120 nm | 120 nm | 120 nm |
| 10 | TiN$_x$ | 5 nm | 10 nm | — | 10 nm |
| 3 | SiO$_2$:Al | 35 nm | 35 nm | 35 nm | 35 nm |
| 1 | Glass | 2.1 mm | 2.1 mm | 2.1 mm | 2.1 mm |

TABLE 3

| Reference Character | Material | Thickness | | | |
|---|---|---|---|---|---|
| | | Example 5 | Example 6 | Example 7 | Example 8 |
| 2   6 | SiO$_2$:Al | 70 nm | 70 nm | 70 nm | 70 nm |
| 10 | TiN$_x$ | — | — | — | 20 nm |
| 5 | Si$_3$N$_4$:Al | 20 nm | 20 nm | 20 nm | 20 nm |
| 10 | TiN$_x$ | 20 nm | 20 nm | 30 nm | — |
| 4 | ITO | 120 nm | 120 nm | 120 nm | 120 nm |
| 10 | TiN$_x$ | — | 20 nm | — | — |
| 3 | SiO$_2$:Al | 35 nm | 35 nm | 35 nm | 35 nm |
| 1 | Glass | 2.1 mm | 2.1 mm | 2.1 mm | 2.1 mm |

The observations on the test panes are summarized in Table 6. $R_{square}$ is the sheet resistance of the coating 2. $T_L$ indicates the transmittance of the panes for visible light. $R_L$ indicates the reflectivity of the panes for visible light. $A_L$ indicates the absorption of the panes for visible light. The optical condition of the coating is influenced, in particular, by clouding ("haze") as well as cracks.

By means of the coatings 2 according to the invention with the darkening layers 10, the transmittance of the pane is further reduced. The temperature treatment during the bending of the pane results in a reduction of sheet resistance and, thus, to reduced emissivity. The darkening layer 10 is not oxidized, which would result in a significant increase in the transmittance $T_L$. The bending process also does not result in damaging of the coating such that the optical condition of the layer is good in all cases.

Comparative Examples

The Comparative Examples differ from the Examples according to the invention by the thermal radiation reflecting coating 2. The coatings comprised, as in the Examples, the lower dielectric layer 3, the functional layer 4, the upper dielectric layer 5, and the antireflection layer 6. However, the coatings included no darkening layers 10 according to the invention. Instead, each coating had two layers made of a material that did not satisfy the requirements according to the invention for the darkening layer (cf. Table 5, in which the corresponding melting points $T_s$ and specific electrical conductivities ρ are summarized).

The precise layer sequences with the materials used and layer thicknesses of the Comparative Examples 1 to 3 are presented in Table 4. The observations on the test panes are summarized in Table 6.

TABLE 4

| | Material (Thickness) | | |
|---|---|---|---|
| Reference Character | Comparative Example 1 | Comparative Example 2 | Comparative Example 3 |
| 6 | SiO$_2$:Al (70 nm) | SiO$_2$:Al (70 nm) | SiO$_2$:Al (70 nm) |
| 5 | Si$_3$N$_4$:Al (20 nm) | Si$_3$N$_4$:Al (20 nm) | Si$_3$N$_4$:Al (20 nm) |
| | NiCr (10 nm) | Ti (10 nm) | NiCrN (10 nm) |
| 4 | ITO (120 nm) | ITO (120 nm) | ITO (120 nm) |
| | NiCr (10 nm) | Ti (10 nm) | NiCrN (10 nm) |
| 3 | SiO$_2$:Al (35 nm) | SiO$_2$:Al (35 nm) | SiO$_2$:Al (35 nm) |
| 1 | Glass (2.1 mm) | Glass (2.1 mm) | Glass (2.1 mm) |

TABLE 5

| | $T_S$/° C. | ρ/μΩcm |
|---|---|---|
| NiCr | 1400 | 100 |
| Ti | 1660 | 43 |

TABLE 6

| | Before Temperature Treatment | | After Temperature Treatment and Bending | | | | |
|---|---|---|---|---|---|---|---|
| | $R_{Square}$ [Ohm/Square] | $T_L$ [%] | $R_{Square}$ [Ohm/Square] | $T_L$ [%] | $R_L$ [%] | $A_L$ [%] | Optical Condition of the Coating |
| Example 1 | 56 | 20.0 | 16 | 22.8 | 3.6 | 73.6 | good |
| Example 2 | 55 | 15.7 | 17 | 18.8 | 2.8 | 78.4 | good |
| Example 3 | 53 | 20.8 | 16 | 22.5 | 1.5 | 76.0 | good |
| Example 4 | 53 | 19.7 | 16 | 22.2 | 4.9 | 72.9 | good |
| Example 5 | 48 | 16.7 | 19 | 18.8 | 5.2 | 76.0 | good |
| Example 6 | 50 | 11.2 | 18 | 13.2 | 1.7 | 85.1 | good |
| Example 7 | 28 | 13.4 | 16 | 15.8 | 0.6 | 83.6 | good |
| Example 8 | 47 | 15.6 | 21 | 18.9 | 0.8 | 80.3 | good |
| Comparative Example 1 | 35 | 5.9 | 12 | 6.9 | 5.4 | 87.7 | unacceptable |
| Comparative Example 2 | 52 | 14.6 | 18 | 25.8 | 6.0 | 68.2 | unacceptable |
| Comparative Example 3 | 44 | 6.7 | 25 | 6.6 | 9.8 | 83.6 | unacceptable |

The darkening layers not according to the invention made of NiCr, Ti, or NiCrN are damaged by the temperature treatment with the bending process such that the optical condition of the coating was in all cases unacceptable for customers in the automotive sector. In addition, in particular the absorber layers made of Ti are not sufficiently oxidation resistant, so they have, after the temperature treatment, significantly increased transmittance $T_L$.

From Table 6, it is furthermore discernible that, in particular, transmittance can be influenced by the thickness of the darkening layers 10. This yields the preferred ranges for the thickness of the darkening layer 10.

By means of the darkening layers 10 according to the invention, a reduction in the transmittance of the thermal radiation reflecting coating is achieved. The darkening layers 10 are sufficiently corrosion and oxidation resistant to withstand a temperature treatment and a bending process without damage. This result was unexpected and surprising for the person skilled in the art.

LIST OF REFERENCE CHARACTERS (1) substrate
(2) thermal radiation reflecting coating
(3) lower dielectric layer
(4) functional layer
(5) upper dielectric layer
(6) antireflection layer
(7) cover layer
(8) cover pane
(9) thermoplastic intermediate layer
(10) darkening layer

The invention claimed is:

1. A pane with a thermal radiation reflecting coating, the pane comprising a substrate and at least one thermal radiation reflecting coating on at least one of the surfaces of the substrate, wherein:
   the thermal radiation reflecting coating comprises, in order proceeding from the substrate
      one lower dielectric layer having a thickness from 5 nm to 200 nm and comprising silicon oxide, silicon nitride, zinc oxide, tin oxide, mixed tin zinc oxide, zirconium oxide, hafnium oxide tantalum oxide, tungsten oxide, niobium oxide, or titanium oxide,
      one functional layer having a thickness from 100 to 150 nm and comprising indium tin oxide,
      a darkening layer having a thickness from 10 to 30 nm and comprising a metal nitride having a melting point greater than 1900° C. and a specific electrical resistivity less than 500 μohm*cm, and
      one upper dielectric layer having a thickness from 5 nm to 200 nm and comprises silicon oxide, silicon nitride, zinc oxide, tin oxide, mixed tin zinc oxide, zirconium oxide, hafnium oxide, tantalum oxide, tungsten oxide, niobium oxide, or titanium oxide.

2. The pane of claim 1, which has transmittance in the visible spectral range of less than 25%.

3. The pane of claim 1, wherein:
   the substrate has transmittance in the visible spectral range of less than 15% and the pane with the thermal radiation reflecting coating has transmittance of less than 10%.

4. The pane of claim 1, wherein the thickness of the darkening layer is from 5 nm to 20 nm.

5. The pane of claim 1, wherein the metal nitride of the darkening layer is selected from the groups IV B, V B, and VI B of the periodic system.

6. The pane of claim 1, wherein a melting point of the metal nitride is greater than 2200° C.

7. The pane of claim 1, wherein the upper dielectric layer comprises silicon oxide or silicon nitride.

8. The pane of claim 1, wherein the lower dielectric layer comprises silicon oxide or silicon nitride.

9. The pane of claim 1, wherein the thermal radiation reflecting coating further comprises an antireflection layer, which is arranged above the upper dielectric layer.

10. The pane of claim 1, wherein the thermal radiation reflecting coating further comprises as its uppermost layer a cover layer, which comprises at least one oxide.

11. The pane of claim 1, wherein:
   the substrate is bonded to a cover pane via at least one thermoplastic intermediate layer to form a composite pane; and
   the coating is arranged on the surface of the substrate facing away from the cover pane.

12. The pane of claim 1, which is employed as a pane or a component of a pane in a building or in a means of transportation for travel on land, in the air, or on water.

13. The pane of claim 1, wherein:
   the lower dielectric layer comprises silicon oxide;
   the darkening layer comprises a titanium nitride; and
   the upper dielectric layer comprises silicon oxide.

14. The pane of claim 1, wherein the coating further comprises a second darkening layer between the functional layer and the upper dielectric, wherein the second darkening layer has a thickness from 2 to 50 nm and comprises at least one metal, one metal nitride, one metal carbide, or a mixture thereof, with a melting point greater than 1900° C. and a specific electrical resistivity less than 500 μohm*cm.

15. A method for producing a pane with a thermal radiation reflecting coating, the method comprising applying at least
   (a) one lower dielectric layer having a thickness from 5 nm to 200 nm and comprising silicon oxide, silicon nitride, zinc oxide, tin oxide, mixed tin zinc oxide, zirconium oxide, hafnium oxide, tantalum oxide, tungsten oxide, niobium oxide, or titanium oxide,
   (b) one functional layer having a thickness from 100 to 150 nm and comprising indium tin oxide,
   (c) a darkening layer having a thickness from 10 to 30 nm and comprising a metal nitride having a melting point greater than 1900° C. and a specific electrical resistivity less than 500 μohm*cm, and
   (d) one upper dielectric layer having, a thickness from 5 nm to 200 nm and comprises silicon oxide, silicon nitride, zinc oxide, tin oxide, mixed tin zinc oxide, zirconium oxide, hafnium oxide, tantalum oxide, tungsten oxide, niobium oxide, or titanium oxide
in succession on a substrate.

16. The method of claim 15, wherein the substrate with the coating is heated to a temperature of at least 200° C.

* * * * *